ELECTROCARDIOGRAPH

Filed Aug. 31, 1965 5 Sheets-Sheet 1

INVENTORS
Thomas W. Argy
Richard J. Lorenz
BY Hofgren, Wegner, Allen, Stellman & McCord
ATTORNEYS Feb. 13, 1968 T. W. ARGY ETAL 3,369,249

ELECTROCARDIOGRAPH

Filed Aug. 31, 1965 5 Sheets-Sheet 3

ELECTROCARDIOGRAPH

Filed Aug. 31, 1965 5 Sheets-Sheet 5

3,369,249
ELECTROCARDIOGRAPH

Thomas W. Argy, Chicago, and Richard J. Lorenz, Des Plaines, Ill., assignors to The Hallicrafters Co., a corporation of California Filed Aug. 31, 1965, Ser. No. 484,512
16 Claims. (Cl. 346—33)

ABSTRACT OF THE DISCLOSURE

A graphic recorder actuated by a pair of push-pull driven solenoid coils which move a pivotally mounted stylus arm. The stylus is counterbalanced by a torsion spring and the entire assembly is pivotally mounted for zero adjustment, without stressing the torsion spring or the driving coils. An amplifier for the electrical signals to be recorded has electrical characteristics which complement the mechanical characteristics of the stylus, for linear operation. Coupling capacitors in the circuit are switched together to equalize charges thereon and to avoid jumping of the stylus, on switching between inputs to the recorder.

This invention relates to a graphic recording device and more particularly to a precision portable graphic tape recorder to be utilized, for example, as an electrocardiograph.

It is common in a moving strip chart recorder to use a galvanometer-type rotating coil transducer to drive a recording pen. A deflection sensitivity of 10 millimeters per millivolt is generally utilized in electrocardiograph recorders. Another requirement of an electrocardiograph, however, is that it have a flat response from one cycle per second to substantially 40 cycles per second. Unfortunately, most pen motor galvanometer-type mechanisms are subject to resonant responses in the low frequency region. In such galvanometers, the deflection characteristic is a non-linear function of the frequency of the current through the galvanometer coils. The amplifier which supplies the signal to the galvanometer must be designed with a non-linear frequency matching characteristic so that the deflection is a direct function of the information at the input of the amplifier. This non-linearity in the frequency characteristics of the amplifier requires special circuitry and a large dynamic range. This, too, adds to the weight and cost of the unit. The high cost, size and weight of such a unit make it generally unsatisfactory for portable use. This requires that a patient to be tested must report to a medical laboratory, hospital or doctor's office for the test.

Attempts have been made to use a solenoid-type moving coil driver, similar to a loudspeaker voice coil structure, to drive a recording pen. It is found, however, that such driving structures generally have a mechanical resonance below 40 cycles per second and are thus unsatisfactory for accurate recording. In accordance with the present invention, a solenoid-type transducer is utilized which is mechanically damped, by means of stylus to paper friction and negative feedback. Opposition to coil movement is provided with a stiff torsion bar selected to move the natural mechanical resonance point to a frequency above the range in which high accuracy is desired. Since the solenoid-type transducer and the torsion bar return spring with suitable damping have a linear response to the applied signal over the desired range and therefore the amplifier may be designed for a flat frequency response permitting the use of simplified circuitry.

The invention will be described herein as embodied in an electrocardiograph. While certain of the features of the invention are particularly adapted or designed for an electrocardiograph apparatus, as the technical requirements for such a device are quite stringent, it will be apparent that other types of signals may be recorded.

It is an object of the invention to provide a new and improved precision graphic recorder which can be carried in a briefcase or medical bag and which satisfies the requirements of sensitivity and linearity for an electrocardiograph.

A further object of the invention is to provide a combination mechanical and electrical damping means for linear operation of a recording stylus throughout its operating range.

Another object of the invention is to provide a mounting for a recording stylus with which the base line may be positioned at any point across a graphic recording tape without altering the linearity of the record which is made.

And a further object is to provide a combination mechanical-electrical damping means that eliminates undesired oscillations throughout a predetermined frequency range so that the response to applied signals and frequencies in the range remains substantially constant.

Still another object is to provide a combination recording tape holder and support for the tape as it is marked by a stylus. The combination holder and support is connected to a base structure of the recorder by a linkage which mounts the holder for movement between a first position in which the guide surface is urged into contact with the stylus and a second position extended outwardly to facilitate loading a roll of tape.

Yet a further object is to provide a transducer suitable for converting electrical signals into a permanent record and in which the center of mechanical movement of the recording stylus and of the driving transducer coincide so that the system is at rest without strain on either the transducer support or the stylus return spring. More specifically, the stylus mounting permits adjustment of the stylus rest position, to adjust the zero or base line of the recording, without affecting the rest position of the transducer.

And another object of the invention is to provide a system having substantially linear response over a desired range of frequencies by mechanically modifying the transducer to establish a resonance point at the high end of the desired linear frequency range and incorporating electrical negative feedback to give the required damping for the system above that provided by stylus movement on the paper tape.

Further objects and advantages of the invention will readily be apparent from the following detailed description and from the drawings, in which.

Figure 1:
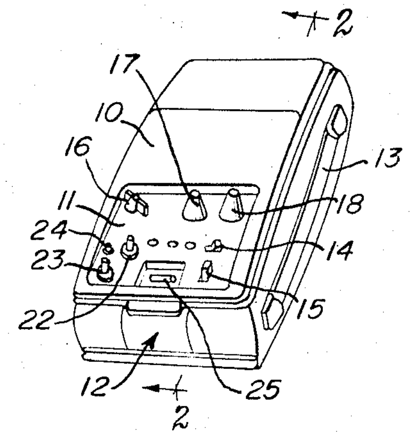
FIGURE 1 is a perspective view of a portable recording apparatus embodying the invention.

Referring first to FIGURE 1, a hand carryable recorder which can fit into a briefcase or medical bag is shown, having a housing 10 with a control panel 11, a tape holder and support 12 and a carrying handle 13. As pointed out above, and as will be apparent from the following detailed discussion, the recorder disclosed herein is designed specifically as an electrocardiograph, but can be utilized for recording many other types of data.

The recessed control panel 11 has thereon a plurality of controls for the various operations of the instrument. These include a power "on-off" switch 14, a tape travel "stop-run" switch 15, a multiple position signal selection switch 16, a "stylus position" control 17, a stylus heat control 18, a "half-amplitude" switch 22, a "gain" control 23, and a "standardization or "reference" push button 24. A transparent window 25 permits the operator to observe the tape and stylus during operation.

Figures 2, 6:
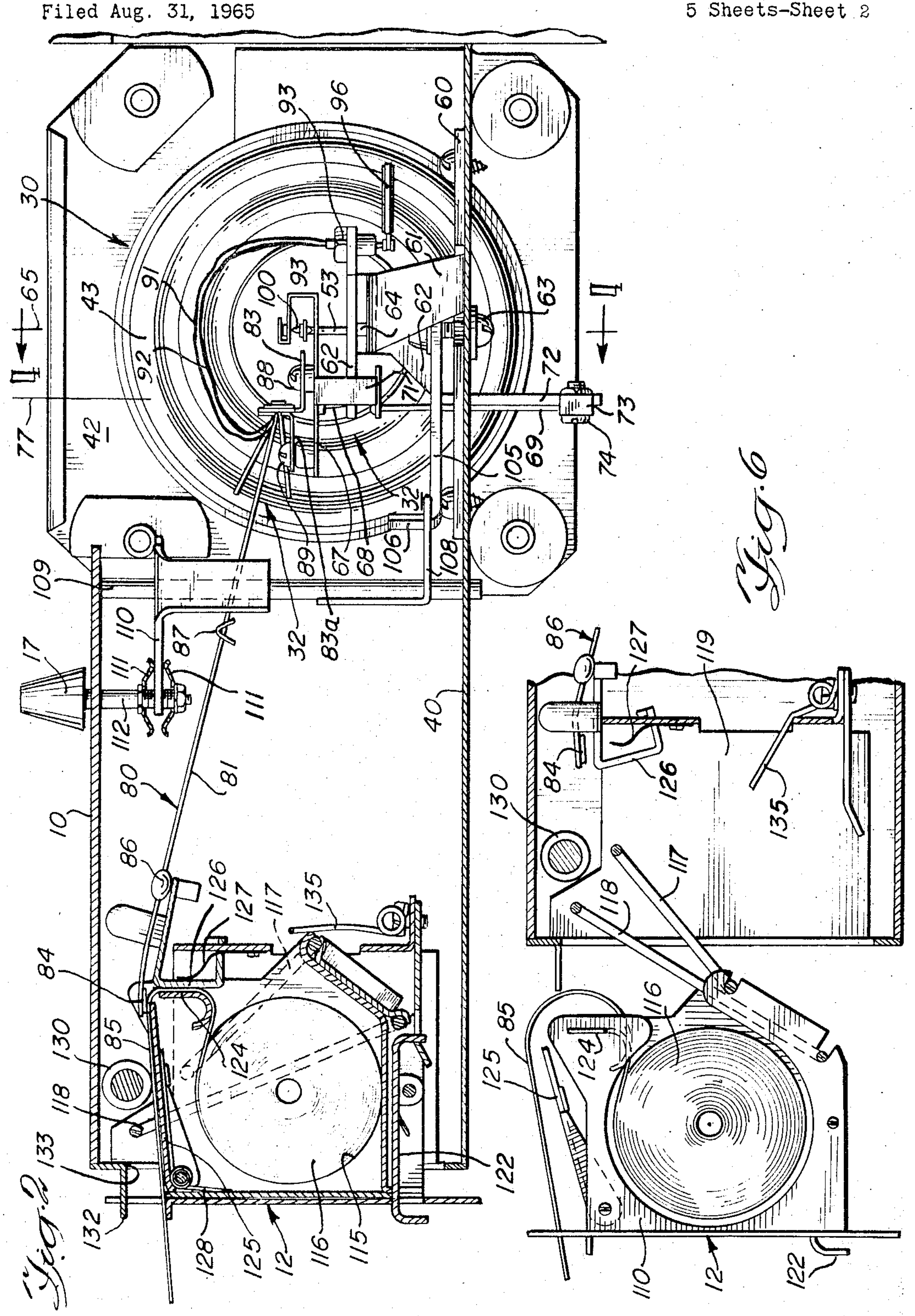
FIGURE 2 is a fragmentary longitudinal section through the apparatus, substantially along line 2—2 of FIGURE 1.
FIGURE 6 is a fragmentary view illustrating the paper roll carrier in extended position.
Figures 3, 9:
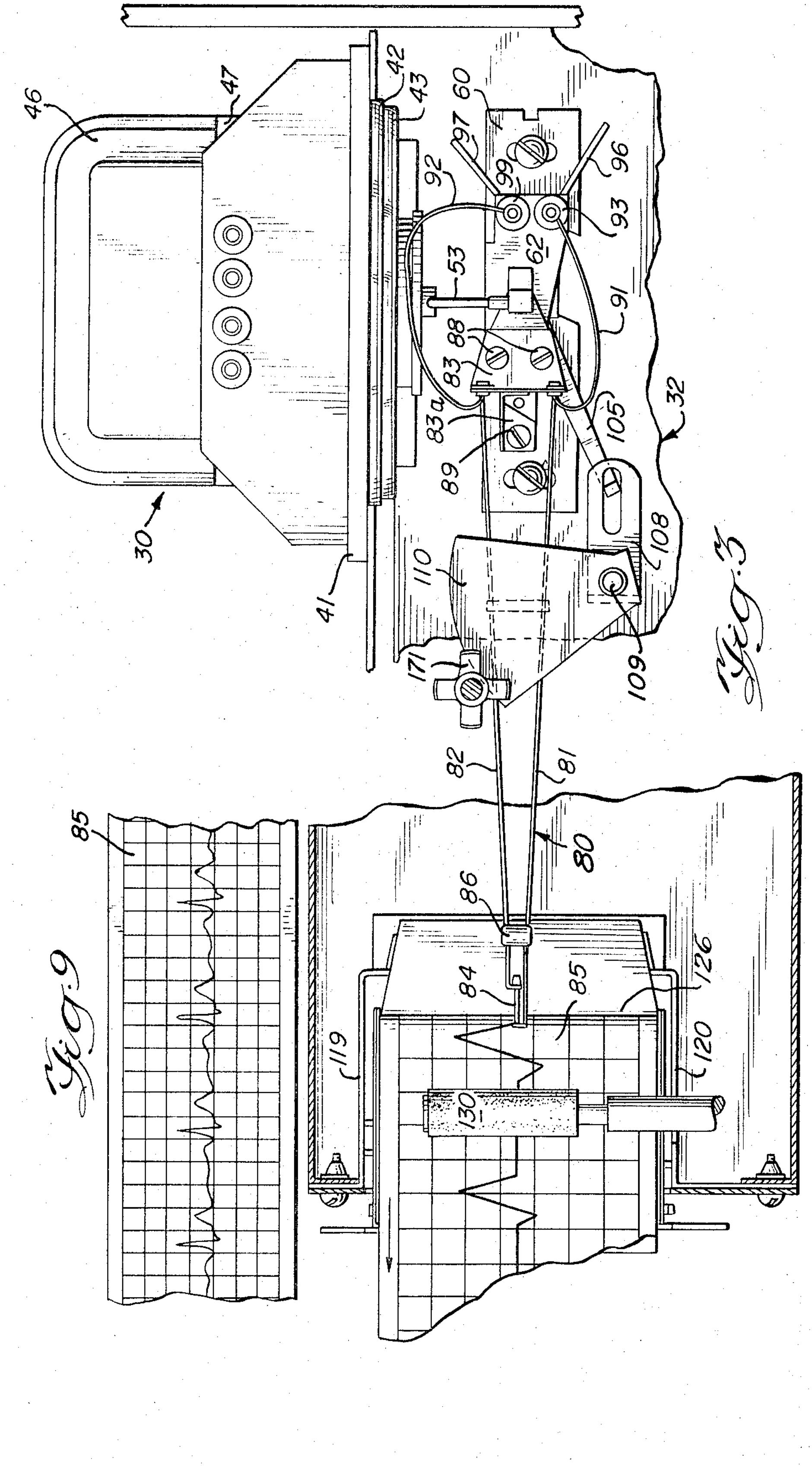
FIGURE 3 is a fragmentary plan view of the portion of the apparatus illustrated in FIGURE 2, with some of the structure broken away.
FIGURE 9 illustrates a section of the tape record.

Turning now to FIGURES 2 and 3, the recorder has a transducer indicated generally at 30, a recording stylus assembly indicated generally at 32, and the combination tape holder and support 12. A signal to be recorded is amplified and applied to transducer 30, moving the stylus back and forth over the recording tape. The active surface of the stylus is electrically heated and leaves a trace on the heat sensitive recording paper (FIGURE 9).

Figures 4, 5:
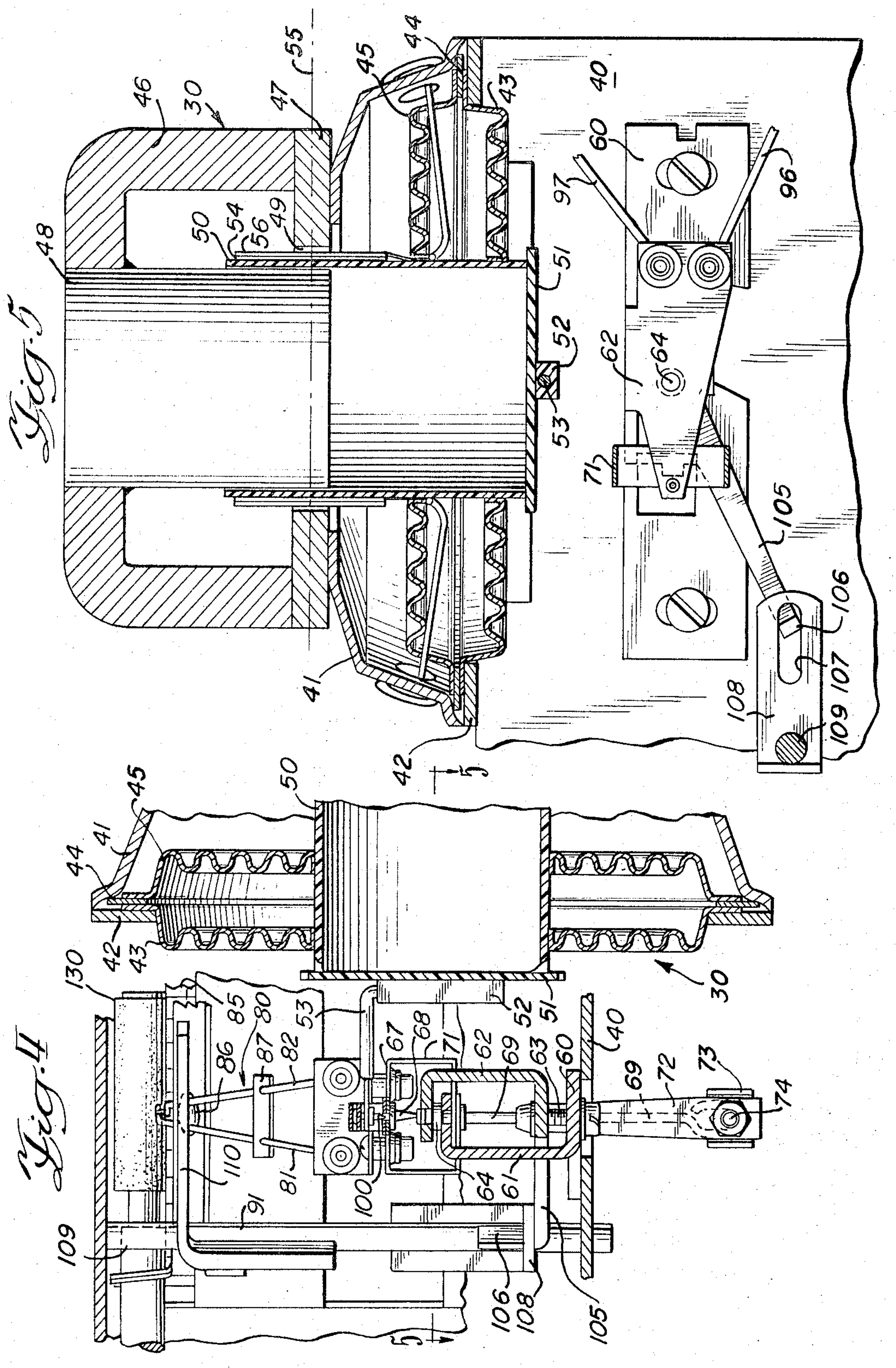
FIGURE 4 is a fragmentary section taken along line 4—4 of FIGURE 2.
FIGURE 5 is a fragmentary section taken along line 5—5 of FIGURE 4.

The transducer 30 is shown in FIGURES 2 and 3 and is illustrated in greater detail in FIGURES 4 and 5. A base 40 has mounted thereon a transducer shell or basket 41. An annular plate 42 is secured to the front of basket 41 and has a central aperture through which a flexible diaphragm 43 extends. A ring spacer 44 separates diaphragm 43 from a complementary diaphragm 45 which extends inwardly of the basket. The two diaphragms have their outer peripheries suitably secured to the support structure, as by an adhesive. A magnetic circuit secured to the rear of the basket 41 includes a U-shaped element 46 and an annular pole piece 47. A magnet 48 extends from the base of U-shaped member 46 into the opening of annular member 47, defining therewith an annular air gap 49. A sleeve 50 is carried by the flexible diaphragms 43 and 45 and extends into air gap 49. The sleeve has wound thereon a pair of superposed coils 54 and 56 which are located with their electrical centers aligned with the center plane 55 of the annular air gap to provide linear symmetrical operation. Currents flowing through the two coils, other than equal and opposite currents, cause sleeve 50 to move either outwardly or inwardly with respect to the magnetic structure with a solenoid-type action, much as the voice coil of a loudspeaker.

A disc 51 secured to the outer end of sleeve 50 prevents dirt from entering the air gap and provides a mounting for a connecting block 52 with which a stylus drive arm 53 is pivotally connected.

Referring still to FIGURES 2 through 5, the stylus structure 32 will be described in detail. A mounting plate 60 is secured to base 40 and has thereon an upstanding pedestal portion 61. A stylus support 62 is pivotally mounted on plate 60 by screw 63 and pin 64, about a first axis 65, which lies in the plane of section 4—4, FIGURE 2. Stylus carrier 67 has a depending pivot 68 received in a bearing on the upper surface of support 62 and held in place thereon by a torsion bar return spring 69, secured at its upper end to yoke 71 which extends downwardly from carrier 67 and encircles the forward end of support 62. The lower end of torsion spring 69 is secured to leg 72 (which extends downwardly from support 62) by a clamp plate 73 and screw 74. Bearing 68 and torsion spring 69 are aligned on a second axis 77.

Stylus 80 is comprised of a pair of wires 81 and 82 which extend forwardly from a bracket 83 and are joined at their forward end by a recording or marker portion 84 of resistive material which engages heat sensitive paper record strip 85. A plastic bead 86 and a paper insulating strip 87 separate the wires 81 and 82 and add rigidity to the stylus. Bracket 83 is secured to stylus carrier 67 by screws 88. The pressure of the marker portion on the paper strip 85 is adjusted by screw 89 which extends through a tab 83*a* on the bracket 83 and into stylus carrier 67. The stylus wires 81 and 82 are connected by short jumpers 91 and 92 with sockets 93 and 94 on support 62. The sockets are in turn connected through leads 96 and 97 with an energizing circuit for resistive marker 84.

Connecting arm 53 etxending outwardly from block 52 on the coil support 50 and carries a needle pivot 100 which is received in bearings on stylus carrier 67. As the coil support 50 of the transducer moves back and forth, the motion is transmitted through connecting arm 53 to the stylus carrier 67 which forms a driven portion of the stylus, causing movement of the stylus about its pivotal portion, i.e., pivot 68. The axis of pivot 100 describes an arc about the axis 77 of stylus carrier pivot 68. When the carrier is at rest, the axis of pivot 100 coincides with the axis 65 of the mounting for stylus support 62.

By virtue of the relationship of the axis 65 for stylus support 62 and the axis of connecting arm pivot 100, the rest position of stylus marker portion 84 on the tape 85 may be varied without moving the position of the coils 54 and 56 of transducer 30. This permits linear, symmetrical operation of the recorder regardless of the base line which may be selected. An adjusting arm 105 extends outwardly from stylus support 62 and has an upturned end 106 received in a slot 107 of link 108 which in turn is mounted on a rotatable pin 109. A sector plate 110 carried by a pin 109 is frictionally engaged by spring washers 111 on a shaft 112 for the stylus position control 17. Rotation of the position control causes rotation of pin 109 and swings arm 105 and the stylus support 62 about the axis 65. As this axis coincides with the axis of connecting arm pivot 100 in its rest position, neither the connecting arm nor the transducer 30 is affected by the adjustment. However, the pivotal axis 77 for stylus 80 is offset from axis 65. Accordingly, marker portion 84 of the stylus in moved on tape 85 by the adjustment of arm 105. Thus, the base line for the information to be recorded may suitably be positioned on the tape.

Figure 7:
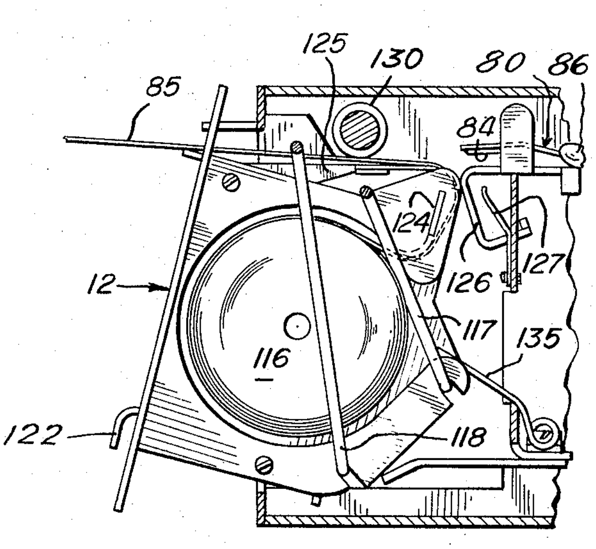
FIGURE 7 is a fragmentary view illustrating the paper roll carrier in an intermediate position between the retracted position of FIGURE 2 and the extended position of FIGURE 6.

The combination tape holder and support 12 will now be described in detail, with particular reference to FIGURES 2, 6 and 7. The tape holder has an arcuate surface 115 which supports tape roll 116. The holder is mounted on the instrument by two U-shaped links 117, 118 each having a pair of arms with ends pivotally received in holes in side panels 119, 120, and is movable between a retracted position, FIGURE 2, and in extended position, FIGURE 6. The tape holder is secured in the retracted position by a latch 122.

Paper tape 85 is led from roll 116 around friction plate 124 and over a pivoted support plate 125. Pressure plate 126 is urged by spring 127 to hold the tape against the friction plate. Support plate 125 is urged upwardly by spring 128 holding the tape 85 against drive roller 130 which is driven by a motor (not shown) to draw the tape from the roll past the marking portion 84 of stylus 80. The tape 85 is moved by roller 130 out of the housing and can be torn off against housing edge 132.

In the extended position of the tape holder, FIGURE 6, supporting surface 115 is exposed on the side to permit insertion and removal of tape roll 116.

The double pivot mounting provided by links 117, 118 causes the holder to swing in such a manner that the tape support plate 125 drops downwardly to clear the top of opening 133 in the housing. As best seen in FIGURE 2, link 117, which is shorter than link 118, is mounted about the top center of side plates 119, 120 and is pivotally secured with the tape holder at its inner edge and about the bottom thereof. The longer link 118 is secured at the top outside corner of the side plates and at a lower intermediate point of the tape holder. When latch 122 is released, spring 135 pushes the tape holder outwardly so that it may be grasped from the outside. In its initial movement, short link 117 swings the inner end downwardly as shown in FIGURE 7. Continued outward movement of the tape holder returns the holder to the horizontal position when fully extended, as shown in FIGURE 6. The swinging motion of the carrier is reversed as it is reurned to the retracted position.

Figure 8:
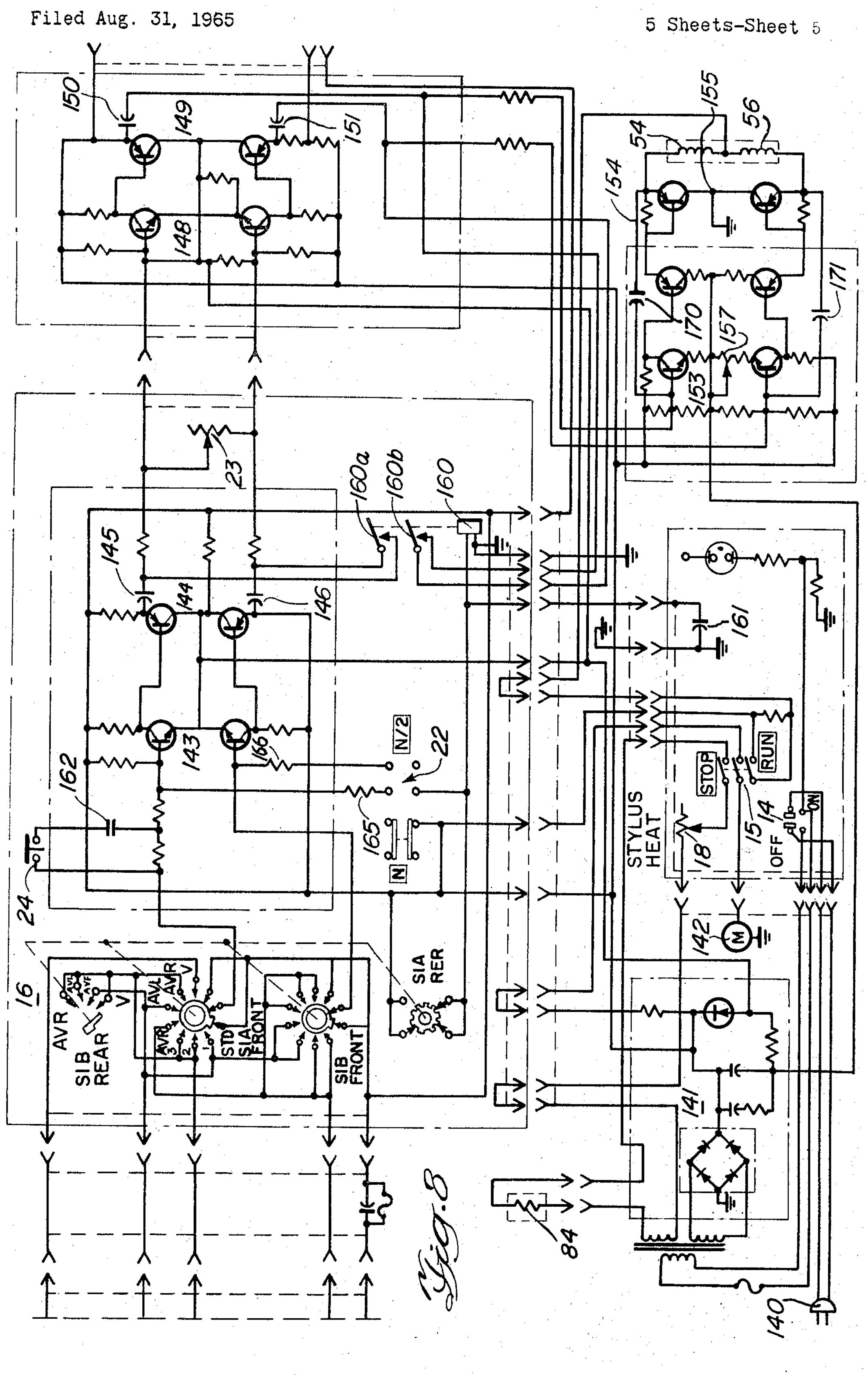
FIGURE 8 is a schematic diagram of the amplifier circuit.

The signals derived from a patient to be recorded for an electrocardiogram are normally only a small fraction of a volt in amplitude. Accordingly, they must be amplified to drive stylus 80. The electrical circuit of the amplifier is shown in FIGURE 8. The circuit is energized through power cord 140 from a suitable source of power, as 120 volts A.C. The amplifier is controlled through on-off switch 14 which connects power supply 141 with the power source. The power supply includes a suitable rectifier and filter providing appropriate voltages to operate the transistor amplifier and a tape drive motor 142. The signals derived from the patient and to be recorded are connected through the three sections of selector switch 16 with the inputs of a push-pull transistor amplifier 143. The specific switching utilized is well known in the electrocardiograph art and will not be described in detail. The output of push-pull amplifier 143 is derived through a pair of emitter followers 144 and coupled through capacitors 145 and 146 to the input of a second push-pull amplifier stage 148. Gain control potentiometer 23 is connected across the signal leads and provides a variable attenuation for the output of emitter followers 144. The signals are coupled from the second pair of push-pull amplifiers 148 followed to a second pair of emitter followers 149. The outputs of followers 149 are coupled through capacitors 150, 151 to a third pair of push-pull amplifiers 153. The signals are direct coupled through emitter followers 154 to output amplifiers 155. Transducer coils 54 and 56 are connected directly with the outputs of push-pull amplifier 155. An emitter followers 154 are direct coupled with amplifiers 153, balance control 157 may be connected in the circuit of amplifier 153 at a relatively high impedance level.

The "stop-run" switch 15 has three sections and provides energizing potentials for stylus marker 84 (through stylus heat control potentiometer 18), for tape drive motor 142 and for push-pull output stage 155. When the switch 15 is in the stop position, the tape does not move, the stylus does not mark and the transducer does not utilize full operating current.

In switching the amplifier input from channel to channel, it is necessary to reestablish the electrical balance of the amplifier so that the base line of the tracing is not modified by an unbalanced D.C. current through coils 54 and 56. This is accomplished by equalizing the charges which accumulate on capacitors 145, 146 and 150, 151. With these charges equalized, D.C. balance is maintained. A fourth section of selector switch 16 connects a relay 160 with a source of energizing potential each time the switch is moved from one position to another. The energization of relay 160 occurs during the interval of switching when the amplifier input is open. Energization of relay 160 closes contacts **160*a* and 160*b*, shorting capacitors 145 and 146 and capacitors 150 and 151 together. Capacitor 161** across the relay coil charges and keeps the relay energized for approximately one second.

For calibration of the recorder, a standard voltage is provided by battery 162 and is connected through a "standard" push button 24, with the amplifier input. Application of this potential through the amplifier results in deflection of the stylus which may be set to the desired amplitude by adjustment of gain control 23.

In the event a signal is received of such amplitude that it would cause deflection of the stylus off the tape, the amplitude of the incoming signal can be reduced to one-half by operation of half amplitude switch 22 to connect a pair of loading resistors 165, 166 across the amplifier input.

Figure 10:
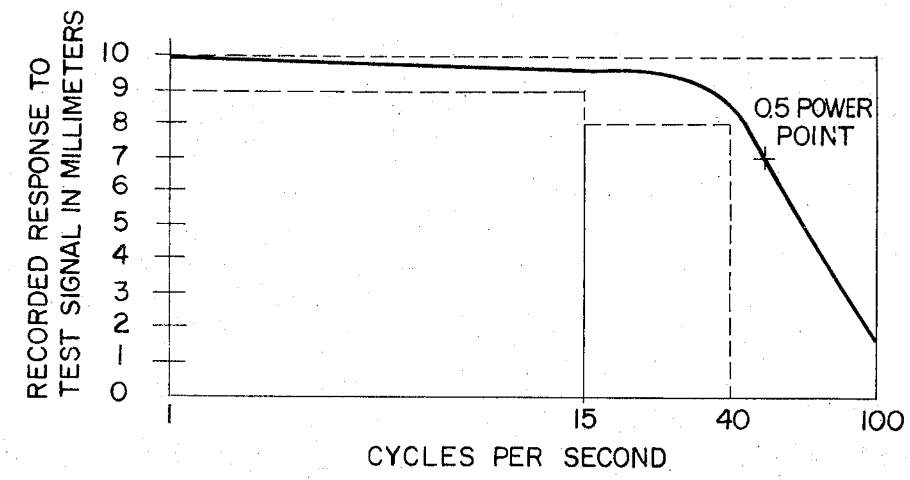
FIGURE 10 is a curve illustrating the frequency response characteristics of the recorder.

The recommendations of the Council of Physical Medicine and Rehabilitation of the American Medical Association provide the generally recognized frequency response requirements for an electrocardiogram. These standards are illustrated graphically in FIGURE 10. The dashed lines indicate the recommendations of the Council while the solid curve represents the typical response of the recorder disclosed herein. Briefly, the Council recommends recorded deflection between 9 and 10 millimeters for a one millivolt peak sinusoidal voltage variation from 1 to 15 cycles per second. The response may be between 8 and 10 millimeters per millivolt for frequencies of 15 to 40 cycles per second. Above 40 cycles per second, the response may fall off as these higher frequencies are of little interest. An examination of the solid line curve shows the instrument described herein has a response well within these requirements, and with a rapid drop-off above 40 cycles per second. The half power point is at about 50 cycles per second.

Several factors in the design of the instrument contribute to this characteristic. The transducer mechanism itself, i.e., the moving coils and supporting diaphragm structure, exhibit a mechanical resonance generally between 30 and 35 cycles per second. The transducer alone would be unsatisfactory for an electrocardiograph unless elaborate precautions were taken to compensate for the resonance effect. In the apparatus disclosed herein, however, the torsion bar return spring opposes coil movement and shifts the mechanical resonance point upward by about 10 to 20 percent. This moves the resonance out of the extremely critical range for electrocardiograph recording. The effects of resonance at the higher frequency are compensated electrically by providing negative feedback in the amplifier. Capacitors 170, 171 are connected between the output of push-pull amplifier 155 and the input of push-pull amplifier 153. This negative feedback provides the damping required to critically damp the transducer at its natural resonance frequency.

While we have shown and described certain embodiments of our invention, it is to be understood that it is capable of many modifications. Changes, therefore, in the construction and arrangement may be made without departing from the spirit and scope of the invention as disclosed in the appended claims.

We claim:

1. A graphic recorder for an electrical signal, comprising means defining a magnetic circuit with an air gap therein, a coil having a longitudinal axis and movable in said air gap along said axis, the amplitude of movement being a linear function of the current through the coil, an elongated recording stylus extending generally at right angles to the longitudinal axis of said coil and mounted for pivotal movement about an axis at right angles to the stylus and to the coil axis, said pivotal axis being laterally offset from the coil axis along the length of said stylus, a torsion bar return spring connected with said stylus and aligned with said pivotal axis, and a stylus drive arm pivotally connected with the coil on the axis thereof and with the stylus on an intersection of an extension of the coil axis with the stylus.

2. The graphic recorder of claim 1 wherein said recording stylus comprises an elongated element pivotally connected to said coil at a first pivot point; means pivotally supporting said element at a second pivot point spaced from said first pivot point; and means for selectively shifting said element supporting means including said second pivot point about said first pivot point.

3. The graphic recorder of claim 2 wherein said torsion bar return spring is secured to said element substantially at said second pivot point, said selective shifting means further being operative to shift said torsion bar return spring about said first pivot point simultaneously with said element supporting means.

4. The graphic recording device of claim 1 wherein said stylus is elongated and has one end thereof connected to said coil for movement therewith, said torsion bar return spring being connected to said stylus at a point intermediate the ends of said stylus.

5. A graphic recorder for an electrical signal, comprising means defining a magnetic circuit with an air gap therein, two co-extensive coils having a rest position centered in said air gap, said coils having a longitudinal axis and movable in said air gap along said axis, the amplitude of movement being a linear function of the current through the coil, a recording stylus connected with said coil for movement therewith, a torsion bar return spring for said stylus, having a linear deflection characteristic providing a linear response of the stylus to said signal, and a source of push-pull signal connected with said coils.

6. In a graphic recording device for transforming electrical signals from a push-pull source into mechanical motion to drive a recording stylus, a transducer comprising a center magnetic core, a ferromagnetic member forming a magnetic path from one end of said magnetic core to an air gap adjacent the other end of the core which it forms with said core, a support structure secured to said ferromagnetic member, a flexible member mounted in said support structure, a sleeve secured to said flexible member for movement about said other core end through said air gap and adapted to be connected to a recording stylus, a first coil for connection with said source wound on said sleeve with a center which is aligned with a center plane of said air gap, and a second coil for connection with said source wound over said first coil with a center which is aligned with the center plane of said air gap.

7. The transducer of claim 6 in which the flexible member comprises a pair of complementary flexible diaphragms having central openings in which said sleeve is mounted.

8. A graphic recording device according to claim 6 further including a source of electrical signals including a two channel amplifier having corresponding stages connected in an opposing push-pull relationship, and means for connecting one of said coils to one of said channels and the other of said coils to the other of said channels.

9. The invention of claim 8 wherein each of said channels includes a negative feedback circuit which provides the required damping to critically damp the transducer.

10. In a graphic recording device a mounting assembly for a recording stylus comprising a base, a mounting member pivotally secured to said base for rotation about a first axis, a stylus, having a recording portion, a driven portion and a pivotal portion, pivotally mounted on said mounting member about a second axis parallel to said first axis and which passes through said pivotal portion of said stylus, and means for connecting the driven portion to a driving means including a pivotal connection which pivots about a third axis which describes an arc as the stylus is rotated about the second axis and which approximately coincides with the first axis when the stylus is at one position of rotation about the second axis, whereby rotation of the mounting member about said first axis adjusts the position of the recording portion of the stylus without changing the position of the driven portion.

11. The mounting assembly of claim 10 including means for rotating said mounting member.

12. The mounting assembly of claim 10, wherein an adjusting arm extends from said mounting member, and an auxiliary adjustment shaft is mounted for movement parallel with said axes, said shaft having a pin and slot connection with said adjusting arm.

13. In a graphic recording device a mounting assembly for a recording stylus comprising a base, a mounting member pivotally secured to said base for rotation about a first axis, an elongated stylus, having in longitudinally spaced relation a recording end, a driven portion opposite the recording end and an intermediate portion interposed between said recording end and said driven portion, said stylus being pivotally mounted on said mounting member about a second axis parallel to said first axis and which passes through said intermediate portion of said stylus, and means for connecting the driven portion to a driving means including a pivotal connection which pivots about a third axis which describes an arc as the stylus is rotated about the second axis and which approximately coincides with the first axis when the stylus is at rest, whereby rotation of the mounting member about said first axis adjusts the position of the recording portion of the stylus without changing the position of the driven portion.

14. The stylus mounting assembly of claim 13, including a torsion bar return spring having one end secured to said base and an opposite end secured to said stylus, said bar having a center line which approximately coincides with said second axis.

15. A graphic recording device comprising a stylus, a transducer mechanically connected to said stylus to drive said stylus, an amplifier having two corresponding channels of amplification stages, with means for shorting corresponding interstage coupling leads in the channels to equalize the voltage therein, and having an output for each channel connected to the transducer, and a signal selection device including a multiple position switch having a movable contact and a multiplicity of cooperating fixed contacts for selecting the input signal to said amplifier and having another switch which is operatively connected to said multiple position switch so that said other switch is closed whenever the movable contact is in transit between any two of said fixed contacts, said other switch when closed actuating said shorting means to equalize said channels and center said transducers.

16. A graphic recording device comprising a stylus, a transducer mechanically connected to said stylus to drive said stylus, a two channel amplifier having two series of corresponding stages connected in opposing push-pull relationship with a signal path at an elevated impedance level with respect to a reference, said amplifier having a coupling capacitor in each channel between two successive stages and having an output for each channel connected to said transducer, and a switch for selectively and momentarily connecting said capacitors in a low resistance series circuit to equalize the charge thereon and to return said stylus to a predetermined position.

References Cited

UNITED STATES PATENTS

| | | | |
|---|---|---|---|
| 1,060,761 | 5/1913 | Hodgkinson | 346—72 XR |
| 2,078,763 | 4/1937 | Hubbard | 346—139 |
| 2,439,640 | 4/1948 | Traugott | 128—2.06 |
| 2,478,329 | 8/1949 | Shaper | 324—113 |
| 2,638,401 | 5/1953 | Lukacs | 346—33 |
| 2,502,419 | 4/1950 | Cannon et al. | 346—33 |
| 2,645,550 | 7/1953 | Gorham | 346—139 XR |
| 2,684,278 | 7/1954 | Marchand | 346—33 |
| 2,687,935 | 8/1954 | Cannon | 346—33 |
| 2,842,421 | 7/1958 | Dreyfus | 346—116 |
| 3,283,335 | 11/1966 | Sachleben | 346—145 |

RICHARD B. WILKINSON, *Primary Examiner.*

J. W. HARTARY, *Assistant Examiner.*